United States Patent
Stangeland

(10) Patent No.: US 11,624,470 B2
(45) Date of Patent: Apr. 11, 2023

(54) DIVERTING PIGS IN A PIPELINE OR PIPING SYSTEM

(71) Applicant: Subsea 7 Norway AS, Stavanger (NO)

(72) Inventor: Oivind Stangeland, Sandnes (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 17/296,957

(22) PCT Filed: Nov. 25, 2019

(86) PCT No.: PCT/EP2019/082478
§ 371 (c)(1),
(2) Date: May 25, 2021

(87) PCT Pub. No.: WO2020/109259
PCT Pub. Date: Jun. 4, 2020

(65) Prior Publication Data
US 2022/0026010 A1    Jan. 27, 2022

(30) Foreign Application Priority Data
Nov. 26, 2018 (GB) ..................... 1819204

(51) Int. Cl.
*F16L 55/46* (2006.01)
*B65G 51/24* (2006.01)
*E21B 33/076* (2006.01)
*E21B 43/017* (2006.01)
*F16K 11/085* (2006.01)
(Continued)

(52) U.S. Cl.
CPC .............. *F16L 55/46* (2013.01); *B65G 51/24* (2013.01); *E21B 33/076* (2013.01); *E21B 43/017* (2013.01); *F16K 11/085* (2013.01); *B65G 45/00* (2013.01); *F16L 2101/12* (2013.01)

(58) Field of Classification Search
CPC ..... F16L 55/46; F16L 2102/12; E21B 33/076; E21B 43/017; B65G 51/24
See application file for complete search history.

(56) References Cited

U.S. PATENT DOCUMENTS 2,493,504 A * 1/1950 Roberts .................. F16L 55/46
15/104.062
3,063,080 A  11/1962 Bergman et al.
(Continued)

FOREIGN PATENT DOCUMENTS

CA    2 391 846    12/2003
DE    102010024871    12/2011
(Continued)

*Primary Examiner* — Laura C Guidotti
*Assistant Examiner* — Makena S Markman
(74) *Attorney, Agent, or Firm* — Levy & Grandinetti

(57) ABSTRACT

A pig diverter comprises a hollow housing having a flowline inlet port, a flowline outlet port, a pig entry opening, and a pig exit opening, all communicating with the interior of the housing. A tubular pig holder enclosed by the housing is pivotable between a receiving position and a launching position. In the receiving position, the pig holder is aligned with the pig entry opening to receive a pig and effects fluid communication between the pig entry opening and the flowline outlet port. In the launching position, the pig holder is aligned with the pig exit opening to launch a pig and effects fluid communication between the flowline inlet port and the pig exit opening.

30 Claims, 6 Drawing Sheets

(51) Int. Cl.
*B65G 45/00* (2006.01)
*F16L 101/12* (2006.01)

(56) References Cited

U.S. PATENT DOCUMENTS

| | | | | |
|---|---|---|---|---|
| 3,396,789 | A | * | 8/1968 | Dean .................. E21B 33/076 166/70 |
| 3,545,474 | A | * | 12/1970 | Brown .................. E21B 23/12 137/865 |
| 3,547,142 | A | | 12/1970 | Webb |
| 6,412,135 | B1 | * | 7/2002 | Benson ............. B01D 29/6484 15/104.062 |
| 6,569,255 | B2 | * | 5/2003 | Sivacoe ................ B08B 9/0553 134/8 |
| 7,343,933 | B2 | | 3/2008 | McBeth et al. |
| 7,530,398 | B2 | | 5/2009 | Balkanyi et al. |
| 7,918,283 | B2 | | 4/2011 | Balkanyi et al. |
| 10,619,784 | B2 | | 4/2020 | Filippovitch |
| 10,996,129 | B2 | * | 5/2021 | Da Silva ................. F16L 55/46 |
| 2010/0065140 | A1 | | 3/2010 | Joynson et al. |
| 2010/0229957 | A1 | * | 9/2010 | Oliver .................... B08B 9/055 137/15.07 |
| 2017/0110859 | A1 | * | 4/2017 | Gjerull .................. H02G 1/086 |

FOREIGN PATENT DOCUMENTS

| | | | |
|---|---|---|---|
| EP | 0 563 853 | | 10/1993 |
| EP | 2332869 | | 6/2011 |
| GB | 1278492 A * | 8/1969 | .............. B08B 9/04 |
| GB | 2497893 | | 6/2013 |
| WO | WO 2005/108831 | | 11/2005 |
| WO | WO 2006/068929 | | 6/2006 |
| WO | WO 2010/029395 | | 3/2010 |
| WO | WO2010029395 | | 3/2010 |
| WO | WO 2017/020991 | | 2/2017 |

* cited by examiner

DIVERTING PIGS IN A PIPELINE OR PIPING SYSTEM

This invention relates to controlling the movement of pigs used for internal inspection, diagnosis, repair or cleaning of pipes. Such pigs, or scrapers, are typically used to maintain pipelines and associated piping systems for the production of hydrocarbons, for example in the subsea oil and gas industry.

Oil and gas pipelines transport multiphase fluids that tend to leave solid deposits on the inner surface of the pipeline. Those deposits may comprise sand, muds, hydrates, waxes and/or condensates of asphaltene. As they thicken over time, such deposits can restrict fluid flow along the pipeline and may even, eventually, block it.

Clearly, a pipeline blockage can be extremely disruptive. Remedying such a blockage can be very complex and expensive, especially if the pipeline is located deep underwater. Similarly, internal corrosion, defects or deformities can significantly affect the circularity and internal diameter of a pipeline, and may create points of weakness.

As a subsea pipeline typically has a working life of more than twenty years, it is necessary to detect internal anomalies and to clean deposits from the bore of the pipeline from time to time.

A common way of maintaining the interior of a pipeline is to propel a pig along it. For example, inspection pigs may detect constriction or narrowing of the internal lumen of a pipeline before diagnostic or cleaning pigs are launched into the pipeline to investigate or to remedy the apparent defect.

Pigs may also be used in wax control systems, in particular in 'cold flow' arrangements in which a pipe of a chilling loop is cooled actively to stimulate precipitation and deposition of wax from crude oil onto the inner surface of the pipe. A wax cleaning pig is recirculated around the chilling loop to scrape off the deposited wax, forming a slurry in which wax particles are suspended in oil. The slurry flowing from the outlet of the chilling loop is then directed into a transport pipeline, in which the risk of further wax deposition is mitigated.

In use, pigs are injected into and propelled along a pipe by fluid pressure. Specifically, a pressure differential is created within the pipe between a volume ahead of the pig and a volume behind the pig, with respect to the intended direction of travel. Thus, a pig is driven along a pipe from a pig launcher to a pig receiver by a pressure differential in the pipe between upstream and downstream sides of the pig.

Pigs may have various shapes of circular cross-section, such as spheres, cylinders or dumbbells. Their outer diameter is selected to be a sliding fit within the interior of the pipe so as to maintain the necessary pressure differential. Commonly, a pig has a series of annular circumferential seals, cups or discs that separate the volume within the pipe ahead of the pig from the volume within the pipe behind the pig. It is also known for pigs to comprise a cylindrical block of a resilient material, such as polyurethane foam.

A pipeline will usually comprise connectors, branches and valves. Also, in subsea pipelines, accessories are commonly grouped in structures such as manifolds, pipeline end terminations (PLETs) or in-line tees (ILTs). The restricted space in such structures complicates pig management, requiring additional external piping systems to create pigging loops. Pigging loops can also be created between two or more distinct pipelines that are fluidly connected at one or two points.

It is necessary to use diverters, also known as diverter valves, switch valves or pig handlers, to divert pigs from one pipe path to another. For example, a wax cleaning pig may be bypassed or transferred from the outlet side of a wax control loop to the inlet side of the loop for recirculation in the loop.

Three-way and four-way diverters are well known. They typically comprise a movable valve element in the form of a rotating ball or other rotor containing one or more passageways or bores that can be brought into alignment with various angularly-spaced inlets or outlets as appropriate. For example, EP 0563853 and EP 2332869 disclose diverter valves that comprise a rotor that can be turned inside a body to direct fluid flow, and a pig driven by that flow, to an appropriate outlet.

WO 2005/108831 discloses a multi-port flow selector manifold valve that has a plurality of inlet ports adapted to be coupled to a fluid source and a production outlet adapted to communicate with at least one of those inlet ports. A flow path can be aligned rotatably with each of the plurality of inlet ports.

A valve element may also move by translation instead of by rotation. For example, GB 2497893 discloses a system in which a pig launcher and receiver are connected to distinct drawers or slider blocks to divert pigs into appropriate outlets.

DE 10 2010 024871 discloses a piggable multi-way valve comprising connecting pieces arranged in superimposed planes.

A drawback of diverters like those described above is that fluid flow in the system may be blocked by the valve element when a pig is being diverted. Interruption of the flow may be critical where multiple pipes are connected or when pigging loops are used. Thus, U.S. Pat. No. 7,530,398 discloses bypass lines that allow production flow to bypass a pig handler while a rotor or slider block of the pig handler is being turned between operative positions.

CA 2391846 exemplifies a revolving pig launcher that is not positioned in a main flowline and is unable to provide for permanent flow. There remains a need to divert a pig in a pipeline system without reducing or blocking the flow.

Against this background, the invention resides in a pig diverter, comprising: a hollow housing having a flowline inlet port, a flowline outlet port, a pig entry opening and a pig exit opening, all communicating with the interior of the housing; and a pig holder enclosed by and movable within the housing between a receiving position and a launching position; wherein, when in the receiving position, the pig holder is aligned with the pig entry opening to receive a pig; and when in the launching position, the pig holder is aligned with the pig exit opening to launch a pig and effects fluid communication between the flowline inlet port and the pig exit opening.

When in the receiving position, the pig holder preferably also effects fluid communication between the pig entry opening and the flowline outlet port.

The pig holder may comprise an aperture that is positioned to effect fluid communication with the flowline inlet port when the pig holder is in the receiving position and with the flowline outlet port when the pig holder is in the launching position. For example, the pig holder may be elongate and the aperture may be on an axis transverse to a longitudinal axis of the pig holder. Moreover, the aperture may be offset longitudinally toward one end of the pig holder.

The pig entry opening and the pig exit opening are suitably disposed on respective sides of a longitudinal axis of the housing. They may also communicate with the interior of the housing through respective opposed ends of the housing. Preferably, the pig entry opening and the pig exit opening are substantially equally spaced from the longitudinal axis of the housing.

The pig holder may be a tube that extends along the housing, in which case the opposed ends of the housing are conveniently positioned to close opposed ends of the tube.

The pig holder may be mounted to the housing for pivotal movement about a pivot axis between the receiving position and the launching position. Preferably the pivot axis is aligned with the longitudinal axis of the housing. The pivot axis may be disposed between a receiving axis that extends through the receiving position and a launching axis that extends through the launching position. The receiving axis and the launching axis may be substantially parallel to each other and to the pivot axis, and may be substantially equi-spaced about the pivot axis.

The flowline inlet port and the flowline outlet port are preferably at longitudinally-aligned positions with respect to the longitudinal axis of the housing. Advantageously, angular spacing about the longitudinal axis between the pig entry opening and the pig exit opening substantially matches angular spacing about the longitudinal axis between the flowline inlet port and the flowline outlet port.

A flow path may conveniently be defined within the housing outside the pig holder, in a space between the housing and the pig holder. When the pig holder is in the receiving position, the flow path may effect fluid communication through the housing between the flowline inlet port and the pig exit opening. When the pig holder is in the launching position, the flow path may effect fluid communication through the housing between the pig entry opening and the flowline outlet port. When the pig holder is at an intermediate position between the receiving position and the launching position, the flow path may effect fluid communication through the housing between the flowline inlet port and the flowline outlet port.

The inventive concept embraces a corresponding method of diverting a pig. That method comprises: when a pig holder is on a receiving axis, directing a flow of fluid from a pigging path outlet to a flowline outlet port, and receiving the pig into the pig holder from the pigging path outlet; then moving the pig holder and the received pig from the receiving axis onto a launching axis; and, when the pig holder is on the launching axis, directing a flow of fluid from a flowline inlet port to a pigging path inlet via the pig holder, and launching the pig from the pig holder into the pigging path inlet.

The flow of fluid is preferably directed from the pigging path outlet to the flowline outlet port via the pig holder, when the pig holder is on the receiving axis.

A bypass flow of fluid may be directed around the pig holder within an enclosure in which the pig holder is movable between the receiving axis and the launching axis. For example, the bypass flow of fluid may be directed from the flowline inlet port to the pigging path inlet when the pig holder is on the receiving axis. Similarly, the bypass flow of fluid may be directed from the pigging path outlet to the flowline outlet port when the pig holder is on the launching axis. Also, the bypass flow of fluid may be directed from the flowline inlet port to the flowline outlet port when the pig holder is at an intermediate position between the receiving axis and the launching axis.

The pig holder is conveniently pivoted within the enclosure from the receiving axis to the launching axis and vice versa. For example, the pig holder may be pivoted about a pivot axis that is substantially parallel to the receiving axis and the launching axis.

The flow of fluid may be directed to the flowline outlet port in a direction transverse to the receiving axis. Similarly, the flow of fluid may be directed from the flowline inlet port in a direction transverse to the launching axis. In either case, the flow of fluid may be directed through a side wall of the pig holder.

The pig holder may be returned from the launching axis onto the receiving axis after launching the pig. A pig launched from the pig holder may be received again, in order that the same pig may be recirculated in a loop.

The inventive concept also extends to a subsea installation comprising the pig diverter of the invention or operating in accordance with the method of the invention.

The invention provides a pig diverter or bypass valve that may be used when physically interrupting a fluid conduit by permanently diverting the flow through a loop that is designed to be cleaned by circulating a pig. The invention simplifies pig bypass, for example in a wax control system, and allows a pig to be bypassed from an outlet side to an inlet side of a flow loop. The diverter or valve of the invention can substitute multiple full-bore ball valves and smaller kickline valves.

The diverter or valve of the invention also provides a barrier that prevents inlet flow from bypassing over to outlet flow. However, some minor leakage across or within the diverter is acceptable. This simplifies the design in comparison with a normal valve that needs to seal fully.

In principle, the diverter or valve of the invention comprises two main parts, namely: a housing with inlet and outlet ports or openings; and a pig holder that can move within the housing to serve as a pig receiver/launcher. The pig holder also has inlet and outlet ports or openings that are brought into or out of alignment with the inlet and outlet ports or openings of the housing as the pig holder moves within the housing. In embodiments to be described, the pig holder is turned within the housing by a motor or actuator that is mounted on the housing and that acts between the housing and the pig holder.

In a normal flow state with the pig holder in a receiving position within the housing, a flow of inlet oil enters a void within the housing outside the pig holder and exits to the start of a pig loop. The other end of the pig loop is connected to the housing to send oil out into an export line through an outlet port of the housing.

When a pig arrives at the end of the pig loop, it passes the outlet port and stops in the pig holder, which therefore serves as a pig receiver. The pig holder is then rotated by the actuator, which may for example take between 1.5 seconds and 20 seconds. During this movement, all ports of the pig holder and the housing are ventilated or open as a result of being misaligned with their counterparts. Some of the incoming oil will bypass to the export line, and some of the incoming oil will enter the pig loop.

When rotation of the pig holder is complete, the flow of inlet oil is connected to the pig holder, which then serves as a pig launcher from which the inlet flow will kick off the pig on a new round of the pig loop.

Embodiments of the invention provide a pig diverter that comprises: a housing; a main fluid inlet; a main fluid outlet; a pig loop inlet in fluid communication with the flowline inlet port through the housing; a pig loop outlet in fluid communication with the flowline outlet port through the housing; and a pig holder, carriage or drawer inside the housing operable between first and second configurations.

In the first configuration as a pig receiver, the pig drawer is aligned with the pig loop outlet while the pig loop outlet is in fluid communication with the flowline outlet port through the pig drawer. In the second configuration as a pig launcher, the pig drawer is aligned with the pig loop inlet while the pig loop inlet is in fluid communication with the flowline inlet port through the pig drawer.

The pig drawer may turn or revolve between the first and second configurations. Advantageously, flow paths through the diverter are not interrupted by rotation or other movement of the pig drawer between the configurations.

The pig drawer may, for example, be an elongate hollow tube comprising a lateral aperture or window. The lateral window may be aligned with the flowline outlet port when the pig drawer is aligned with the pig loop outlet, and may be aligned with the flowline inlet port when the pig drawer is aligned with the pig loop inlet.

The inventive concept embraces a pig loop that comprise a pipeline loop fluidly connected to a pig diverter of the invention.

In summary, a pig diverter of the invention comprises a hollow housing having a flowline inlet port, a flowline outlet port, a pig entry opening and a pig exit opening, all communicating with the interior of the housing. A tubular pig holder enclosed by the housing is pivotable between a receiving position and a launching position. In the receiving position, the pig holder is aligned with the pig entry opening to receive a pig and effects fluid communication between the pig entry opening and the flowline outlet port. In the launching position, the pig holder is aligned with the pig exit opening to launch a pig and effects fluid communication between the flowline inlet port and the pig exit opening.

In order that the invention may be more readily understood, reference will now be made, by way of example, to the accompanying drawings in which.

Figure 2:
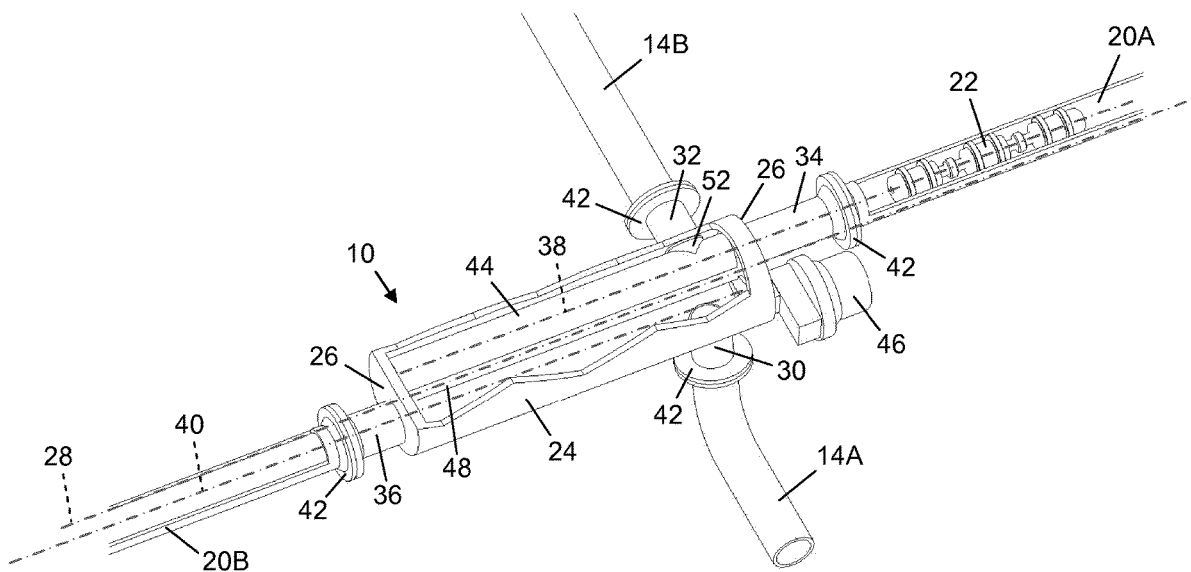
FIG. 2 is a cut-away perspective view of the pig diverter of the invention, showing a pig approaching the diverter at an outlet end of the pigging loop.
Figure 3:
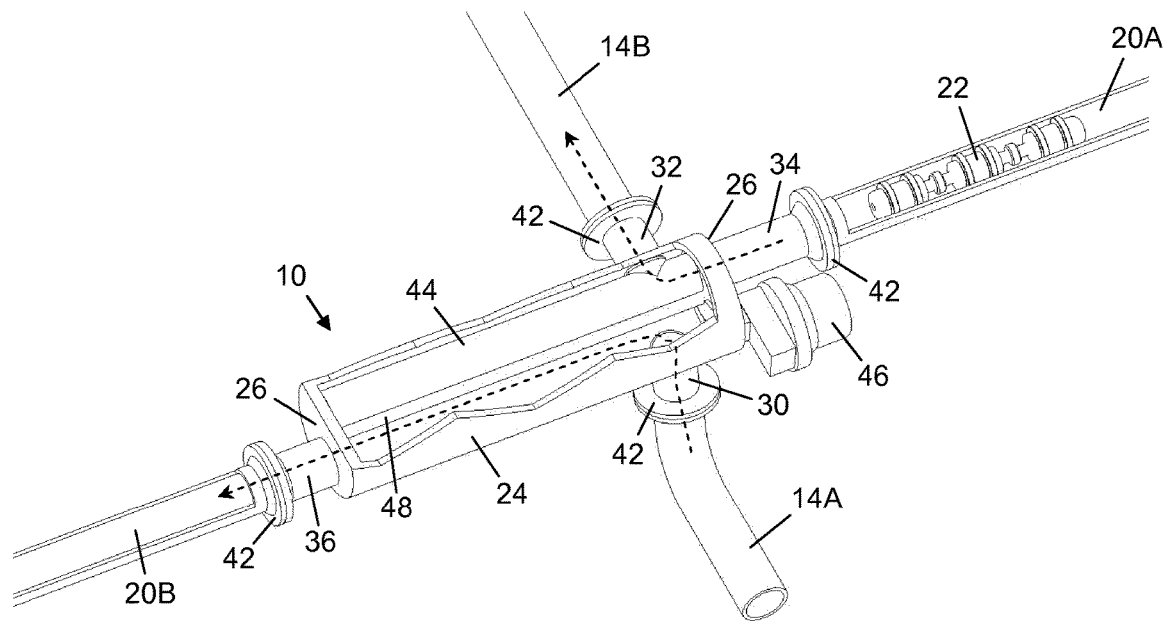
Figure 4:
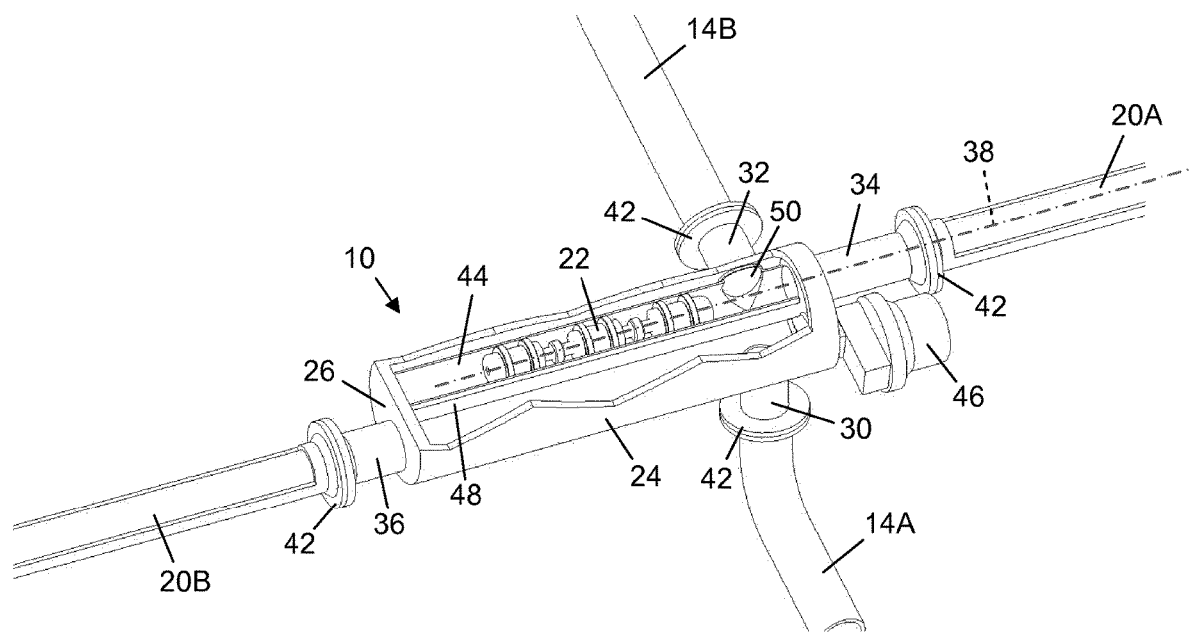
Figure 5:
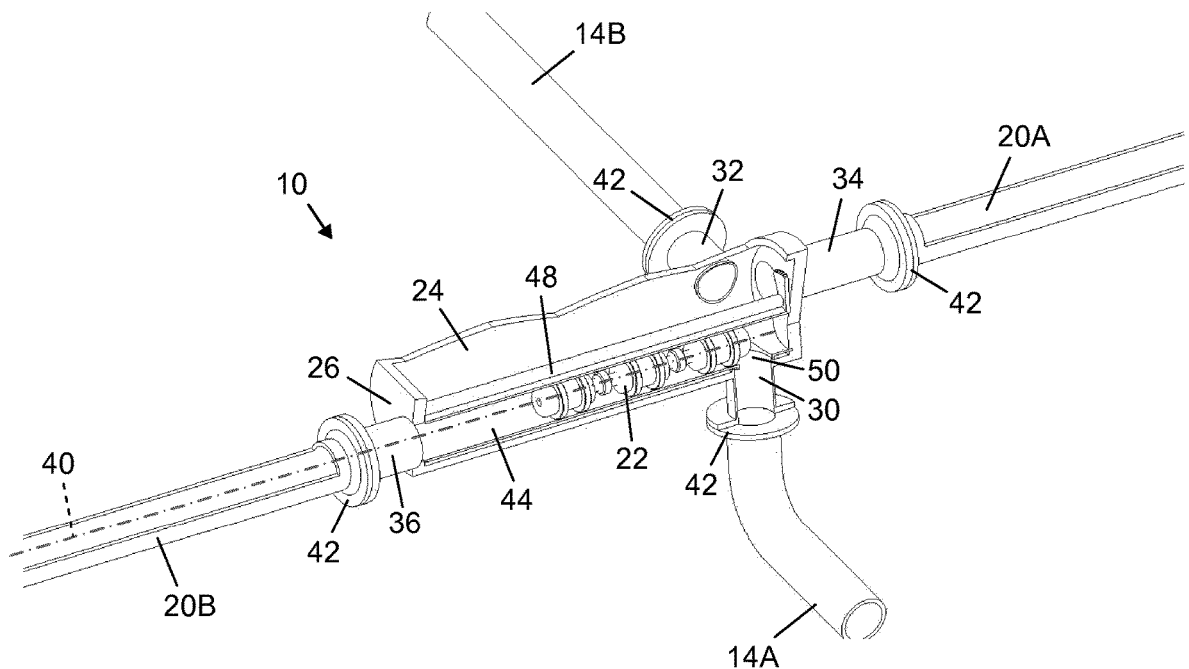
Figure 6:
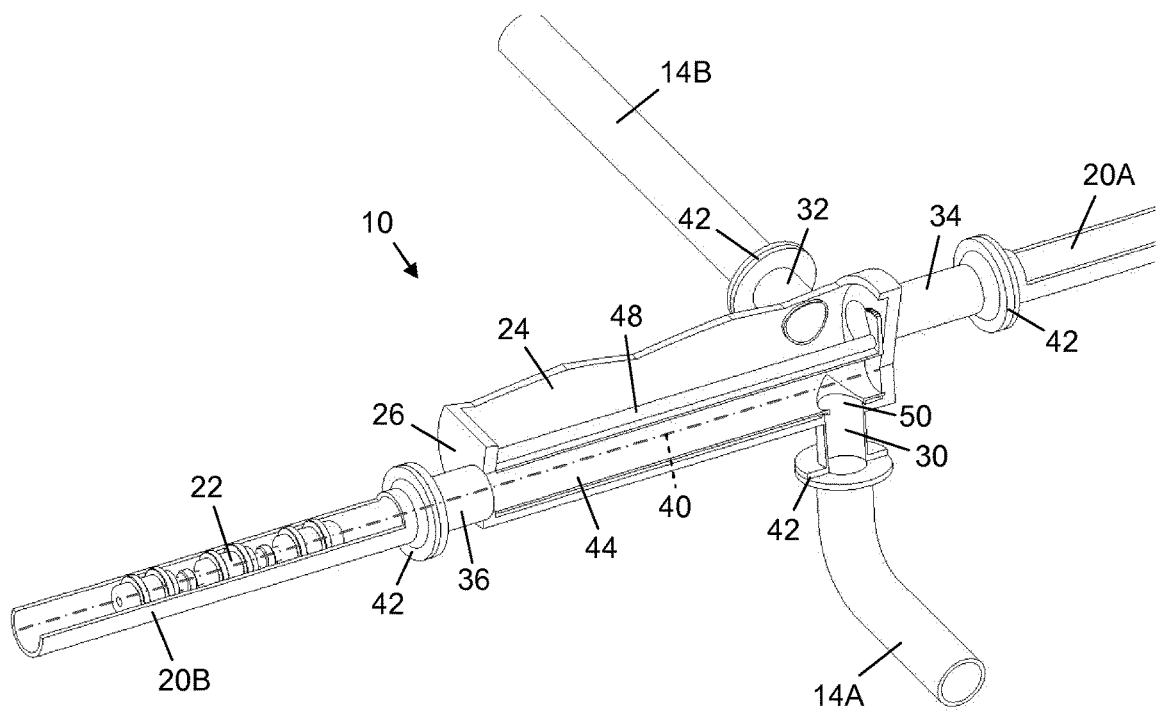
Figure 7:
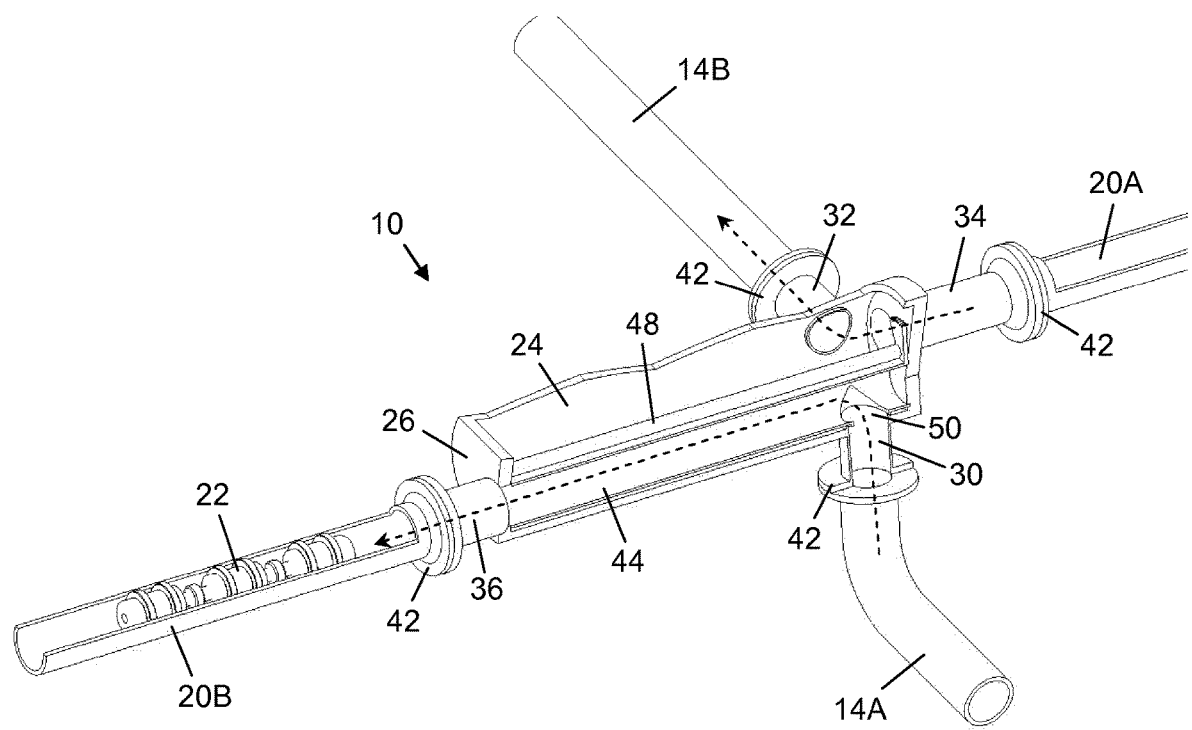
Figure 8:
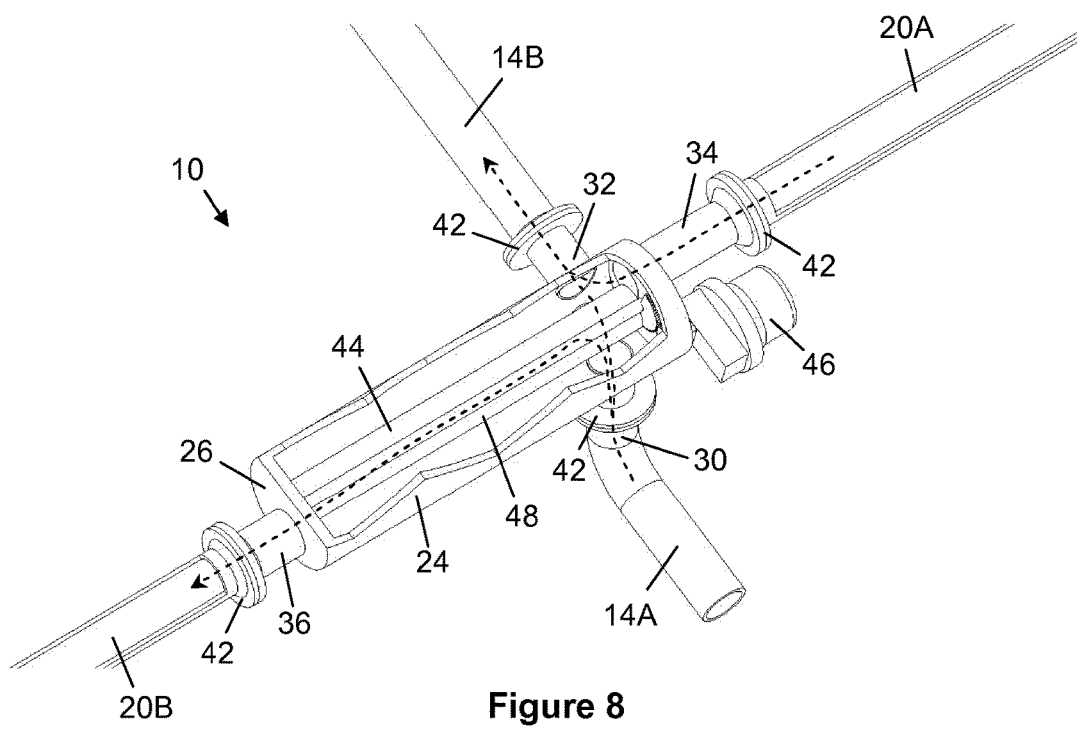

FIG. 3 corresponds to FIG. 2 and shows fluid flow paths through the diverter via a main fluid inlet and a main fluid outlet;

FIG. 4 corresponds to FIG. 2 but shows the pig now received in a holder that is shown here in a receiving position within the diverter, aligned with an outlet end of the pigging loop being an inlet of the diverter;

FIG. 5 corresponds to FIG. 4 but shows the holder now turned into a launching position in which the pig is in alignment with an inlet end of the pigging loop, being an outlet of the diverter;

FIG. 6 corresponds to FIG. 5 and shows fluid flow paths through the diverter via a main fluid inlet and a main fluid outlet;

FIG. 7 corresponds to FIG. 6 but shows the pig now launched from the holder into the inlet end of the pigging loop;

FIG. 8 corresponds to FIGS. 2 to 7 but shows the holder in an intermediate position being turned within the diverter between the receiving and launching positions while carrying the pig; and FIGS. 9*a* to 9*d* are a sequence of enlarged detail perspective views that show a flow aperture of the holder moving from alignment with a main fluid outlet of the diverter into alignment with a main fluid inlet of the diverter.

Figure 1:
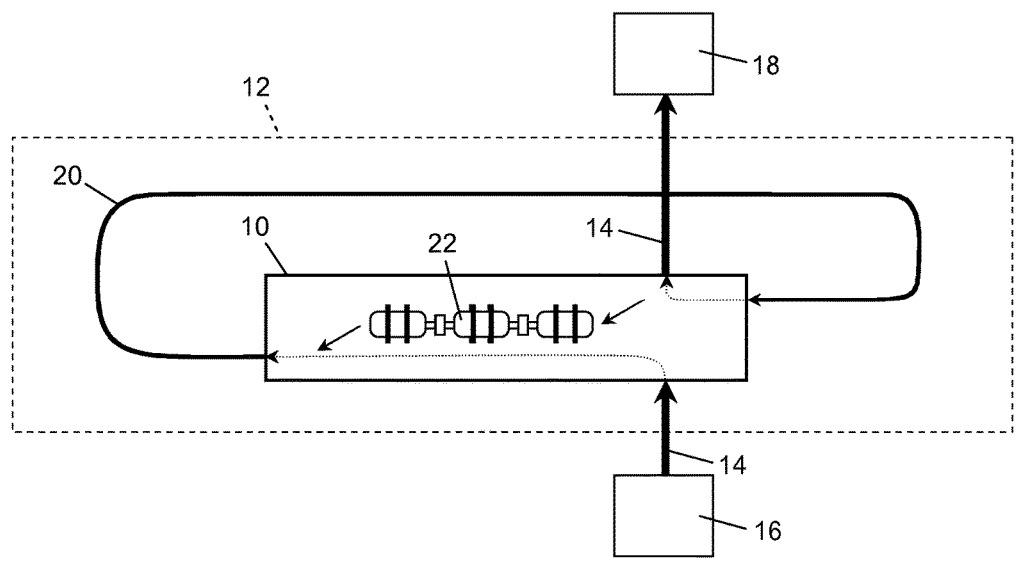
FIG. 1 is a schematic system diagram of a pig diverter of the invention, in fluid communication with a subsea fluid conduit and a pigging loop.

FIG. 1 of the drawings shows a pig diverter 10 of the invention in the exemplary context of a subsea oil and gas installation 12. The diverter 10 is shown here in fluid communication with a subsea fluid conduit or flowline 14 for conveying hydrocarbon production fluid as it flows from a subsea well 16 toward a surface installation 18.

This diagram is of course much simplified. In practice, production fluid will flow through other equipment along the flowline 14 between the subsea well 16 and the surface installation 18, upstream and/or downstream of the diverter 10.

The production fluid is circulated around a pig loop that is exemplified here by a chilling loop 20 for wax control. In accordance with cold-flow principles, a pig 22 is recirculated around the chilling loop 20 to scrape off wax deposits, forming solid wax particles that are entrained in the production fluid flowing out of the chilling loop 20 and back into the downstream part or export line of the flowline 14 that leads to the surface installation 18.

The ends of the chilling loop 20 terminate at the diverter 10. Thus, the pig 22 passes through the diverter 10 on completing each circuit of the chilling loop 20. The pig 22 is shown in FIG. 1 in the diverter 10, being transferred from one end of the chilling loop 20 to the other end of the chilling loop 20 for recirculation.

The diverter 10 serves as a junction for fluid communication between the flowline 14 and the chilling loop 20. Consequently, incoming production fluid flowing along the flowline 14 is directed through the chilling loop 20 via the diverter 10 before resuming its outward journey along the flowline 14, again via the diverter 10.

FIGS. 2 to 8 show the diverter 10 in detail. Externally, the diverter 10 comprises an elongate tubular housing 24 whose ends are closed by end plates 26. A longitudinal axis 28 extends centrally along and within the hollow housing 24. The housing 24 is generally cylindrical and in this example is of circular cross-section, with its curvature centred on the central longitudinal axis 28. Other cross-sectional shapes of the housing 24 are possible. The end plates 26 lie in parallel planes that are orthogonal to the central longitudinal axis 28.

The flowline 14 is represented in FIGS. 2 to 8 by a flowline inlet pipe 14A and a flowline outlet pipe 14B that, respectively, communicate with the diverter 10 via a flowline inlet port 30 and a flowline outlet port 32. The flowline inlet port 30 and the flowline outlet port 32 penetrate the tubular wall of the housing 24, offset longitudinally toward one end of the housing 24 by a distance greater than the length of the pig 22.

The flowline inlet port 30 and the flowline outlet port 32 are at angularly-spaced but longitudinally-aligned positions with respect to the central longitudinal axis 28. In this example, the angular spacing between the flowline inlet port 30 and the flowline outlet port 32 is slightly greater than 90°, although this angle can vary.

The chilling loop 20 is represented in FIGS. 2 to 8 by a loop inlet pipe 20A and a loop outlet pipe 20B that, respectively, communicate with the diverter 10 via a pig entry opening 34 and a pig exit opening 36.

The pig entry opening 34 and the pig exit opening 36 penetrate respective end plates 26 of the housing 24 in mutual longitudinal opposition and in mutual angular opposition about the central longitudinal axis 28. The angular spacing between the pig entry opening 34 and the pig exit opening 36 about the central longitudinal axis 28 matches the angular spacing between the flowline inlet port 30 and the flowline outlet port 32.

The pig exit opening 36 is at an end of the housing 24 remote from the longitudinally-offset flowline inlet port 30 and the flowline outlet port 32. Conversely, the pig entry opening 34 is at the other end of the housing 24 closer to the flowline inlet port 30 and the flowline outlet port 32.

The loop inlet pipe 20A and the loop outlet pipe 20B are substantially straight where they approach and adjoin the end plates 26 of the housing 24 via the pig entry opening 34 and the pig exit opening 36. Specifically, the pig entry opening 34 and the loop inlet pipe 20A lie on a receiving axis 38 and the pig exit opening 36 and the loop outlet pipe 20B lie on a launching axis 40.

As best appreciated in FIG. 2, the receiving axis 38 and the launching axis 40 are parallel to each other and to the central longitudinal axis 28 that extends equidistantly between them. Thus, the pig entry opening 34 and the pig exit opening 36 are equally spaced from the central longitudinal axis 28 in their respective angular positions about the central longitudinal axis 28.

For convenient assembly and disassembly, flanged couplings 42 are provided between the flowline inlet pipe 14A and the flowline inlet port 30, between the flowline outlet port 32 and the flowline outlet pipe 14B, between the loop inlet pipe 20A and the pig entry opening 34, and between the pig exit opening 36 and the loop outlet pipe 20B.

Apart from the penetrations of the flowline inlet port 30, the flowline outlet port 32, the pig entry opening 34 and the pig exit opening 36, the housing 24 is otherwise continuous to define a sealed enclosure. However, the housing 24 is shown in FIGS. 2 to 8 cut away to show the internal features of the diverter 10. In this respect, reference is now also made to the internal details shown in FIGS. 9a to 9d of the drawings.

The housing 24 serves as an enclosure for a pig holder or receiver/launcher, exemplified here by an elongate tube 44, that is mounted inside the housing for movement relative to the housing between the receiving axis 38 and the launching axis 40. Movement of the tube 44 is driven by an actuator 46 that is mounted on one of the end plates 26 of the housing 24. The actuator 46 is reversible to move the tube 44 reciprocally within the housing.

The tube 44 extends longitudinally along the interior of the housing 24, offset laterally from the central longitudinal axis 28. The tube 44 is wide enough internally and long enough to receive and accommodate the full length of the pig 22 as a sliding fit. For this purpose, the internal diameter of the tube 44 substantially matches that of the loop inlet pipe 20A, the pig entry opening 34, the pig exit opening 36 and the loop outlet pipe 20B.

In this example, the tube 44 can be swung about the central longitudinal axis 28 between a receiving position, where the tube 44 is centred on the receiving axis 38, and a launching position, where the tube 44 is centred on the launching axis 40. Thus, radial spacing of the tube 44 from the central longitudinal axis 28 corresponds to the equal radial spacings of the pig entry opening 34 and the pig exit opening 36 about the central longitudinal axis 28.

The tube 44 extends along substantially the full length of the housing 24 between the end plates 26. Consequently, the end plates 26 close the otherwise open ends of the tube 44 except where the appropriate ends of the tube 44 are aligned with the pig entry opening 34 or the pig exit opening 36 that penetrate the respective end plates 26.

The tube 44 is fixed to a longitudinal rod 48 that is centred on the central longitudinal axis 28 and extends the full length of the housing 24. The tube 44 lies parallel to the rod 48 and is offset laterally to one side of the rod 48. The opposed ends of the rod 48 define spigots that extend into the end plates 26 of the housing 24 to form pivots about which the tube 44 can swing within the housing 24.

The tube 44 is continuous apart from a lateral aperture 50 that penetrates the wall of the tube 44 in longitudinal alignment with the flowline inlet port 30 and the flowline outlet port 32. The aperture 50 has an axis that extends transversely, in this example orthogonally, with respect to the central longitudinal axis 28. The aperture 50 is aligned with the flowline outlet port 32 when the tube 44 is in the receiving position and is aligned with the flowline inlet port 30 when the tube 44 is turned into the launching position.

The aperture 50 is surrounded by a skirt 52 that extends radially outwardly from the tube 44 to cooperate with the wall of the housing 24 around the flowline inlet port 30 and the flowline outlet port 32 as the case may be. The skirt 52 facilitates fluid communication between the tube 44 and the flowline outlet pipe 14B or the flowline inlet pipe 14A when the tube 44 is in the receiving position and the launching position respectively.

The skirt 52 and the tube 44 together define a U-section that is substantially symmetrical about a radial plane containing the central longitudinal axis 28. The closed base of the U-section is radially inward and the open side of the U-section is radially outward with respect to the central longitudinal axis 28. A small radial clearance between the open side of the U-section and the adjacent tubular wall of the housing 24 allows the tube 44 to turn within the housing 24 while minimising fluid leakage from or between desired flow paths within the diverter 10.

FIGS. 9a to 9d also show how the actuator 46 drives reciprocal pivotal movement of the tube 44 about the central longitudinal axis 28. In these drawings, the actuator 46 itself has been removed but it will be apparent that a hole 54 penetrates the associated end plate 26, offset laterally from the central longitudinal axis 28. This hole 54 accommodates a drive shaft of the actuator 46 that turns a pinion gear 56, represented here by a dashed circular line, on the inner side of the end plate 26.

The pinion gear 56 meshes with a sector gear 58 that has complementary teeth on its arcuate edge, whose part-circular curvature is centred on the central longitudinal axis 28. The sector gear 58 is fixed to the rod 48 and the tube 44 to turn them about the central longitudinal axis 28 as the actuator 46 turns the pinion gear 56.

Having explained its components in detail, FIGS. 2 to 8 of the drawings will now be described in turn to illustrate the operation of the diverter 10. Further reference will be made to FIGS. 9a to 9d as appropriate.

FIGS. 2 to 4 and 9a show the tube 44 in the receiving position within the housing 24, centred on the receiving axis 38 in alignment with the loop inlet pipe 20A and the pig entry opening 34. FIG. 2 shows the receiving axis 38 extending parallel to the launching axis 40 and to the central longitudinal axis 28.

FIG. 3 shows that production fluid flows into the diverter 10 through the flowline inlet pipe 14A and the flowline inlet port 30. The incoming production fluid then flows along and within the housing 24, on a bypass flow path outside and parallel to the tube 44, to enter the chilling loop 20 via the pig exit opening 36 and the loop outlet pipe 20B.

After passing around the chilling loop 20 and hence propelling the pig 22 in the direction of flow, the flow of production fluid re-enters the diverter 10 through the loop inlet pipe 20A and the pig entry opening 34 as also shown in FIG. 3. The flow of production fluid therefore enters the open end of the tube 44 that is aligned with the pig entry opening 34. The other end of the tube 44 is substantially closed by the end plate 26 at the opposite end of the housing 24. Consequently, the flow of production fluid exits the tube 44 through the lateral aperture 50 that is then in alignment with the flowline outlet port 32. The outgoing flow of fluid then enters the flowline outlet pipe 14B to flow away from the diverter 10.

FIGS. 2 and 3 show the pig 22 in the loop inlet pipe 20A approaching the pig entry opening 34 of the diverter 10. FIG. 4 shows the pig 22 now through the pig entry opening 34 and received in the tube 44 that is aligned with the pig entry opening 34 when in the receiving position. The pig 22 has passed the lateral aperture 50 that is aligned with the flowline outlet port 32. The length of the tube 44 between its closed end and the lateral aperture 50 is sufficient to accommodate the full length of the pig 22.

Turning next to FIGS. 5, 6, 7 and 9d, these drawings show the tube 44 turned by the actuator 46 about the central longitudinal axis 28 into the launching position within the housing 24. Here, the tube 44 is centred on the launching axis 40 in alignment with the pig exit opening 36 and the loop outlet pipe 20B.

The lateral aperture 50 of the tube 44 is now in alignment with the flowline inlet port 30. Consequently, production fluid flowing into the diverter 10 through the flowline inlet pipe 14A and the flowline inlet port 30 flows through the aperture 50 and then along and within the tube 44 to enter the chilling loop 20 via the pig exit opening 36 and the loop outlet pipe 20B. The pig 22 is propelled in the direction of flow within the tube 44 and so is kicked from the tube 44 into the chilling loop 20 via the pig exit opening 36 and the loop outlet pipe 20B as shown in FIG. 6.

After passing around the chilling loop 20, the flow of production fluid re-enters the diverter 10 through the loop inlet pipe 20A and the pig entry opening 34 as shown in FIG. 7. This incoming production fluid then flows along and within the housing 24, on a bypass flow path outside and parallel to the tube 44, to enter the flowline outlet pipe 14B via the flowline outlet port 30 and thus to flow away from the diverter 10.

Once the pig 22 has been launched from the tube 44 into the chilling loop 20 as shown in FIG. 6, the tube 44 can be turned by the actuator 46 back into the receiving position to be ready to receive the pig 22 again after the pig 22 has completed a circuit of the chilling loop 20. In this example, the direction of rotation about the central longitudinal axis 28 is reversed to return the tube 44 to the receiving position. However, it would be possible instead for the tube 44 to return to the receiving position by completing a full revolution about the central longitudinal axis 28.

It will be apparent that the flow of production fluid around the chilling loop 20 and along the flowline 14 is maintained when the tube 44 is in the receiving position and in the launching position. The flow of production fluid along the flowline 14 is also uninterrupted when the tube 44 is moving between the receiving position and the launching position. In this respect, FIGS. 8, 9b and 9c show the tube 44 in intermediate positions being turned about the central longitudinal axis 28 from the receiving axis 38 to the launching axis 40 or vice versa.

Figure 9A:
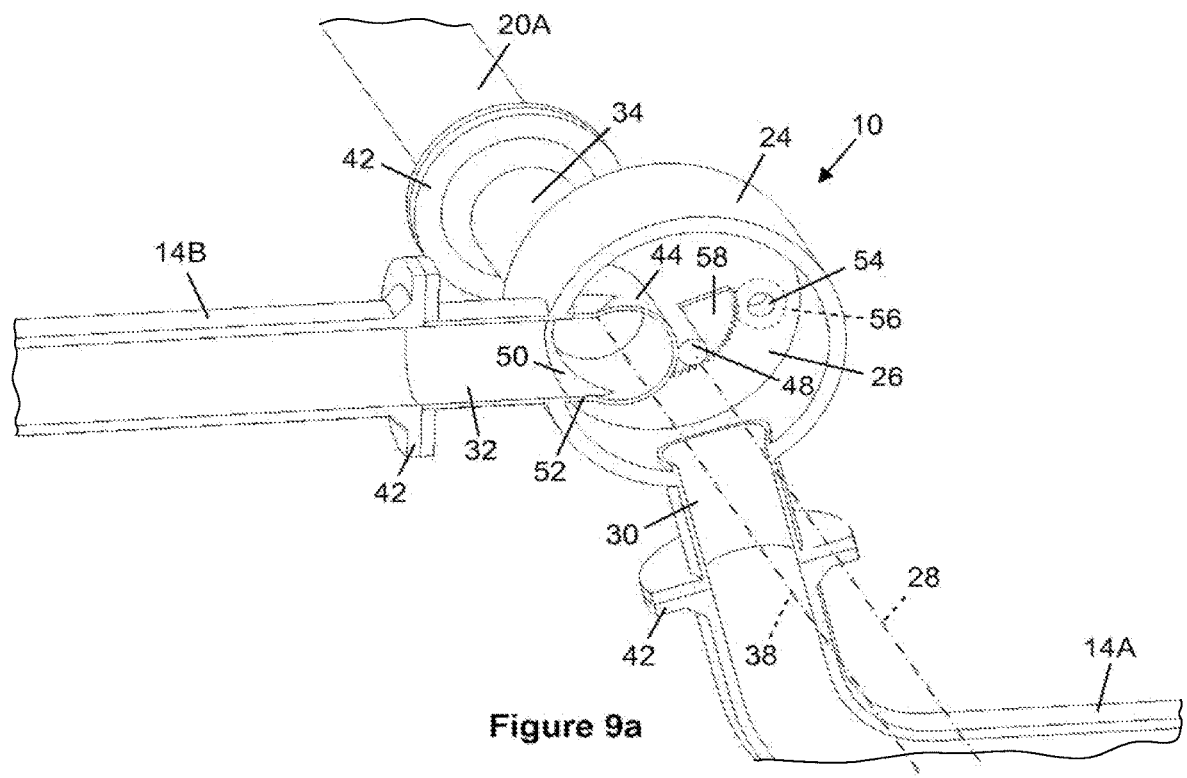
Figure 9B:
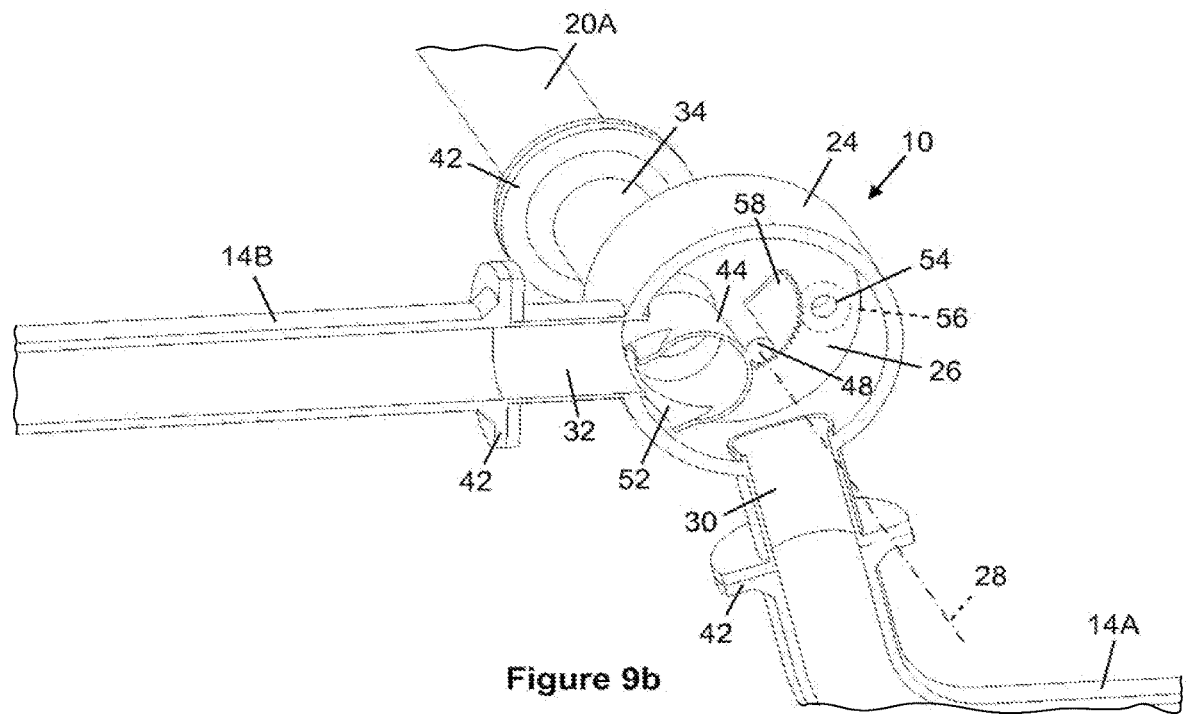
Figure 9C:
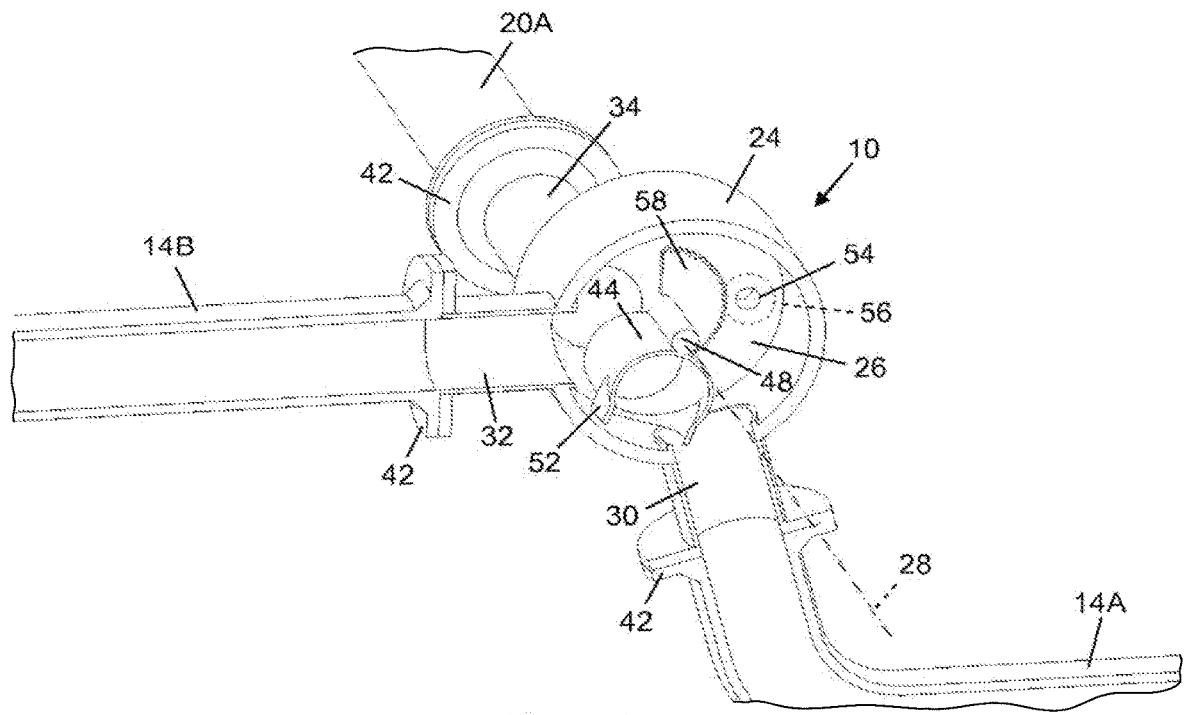
Figure 9D:
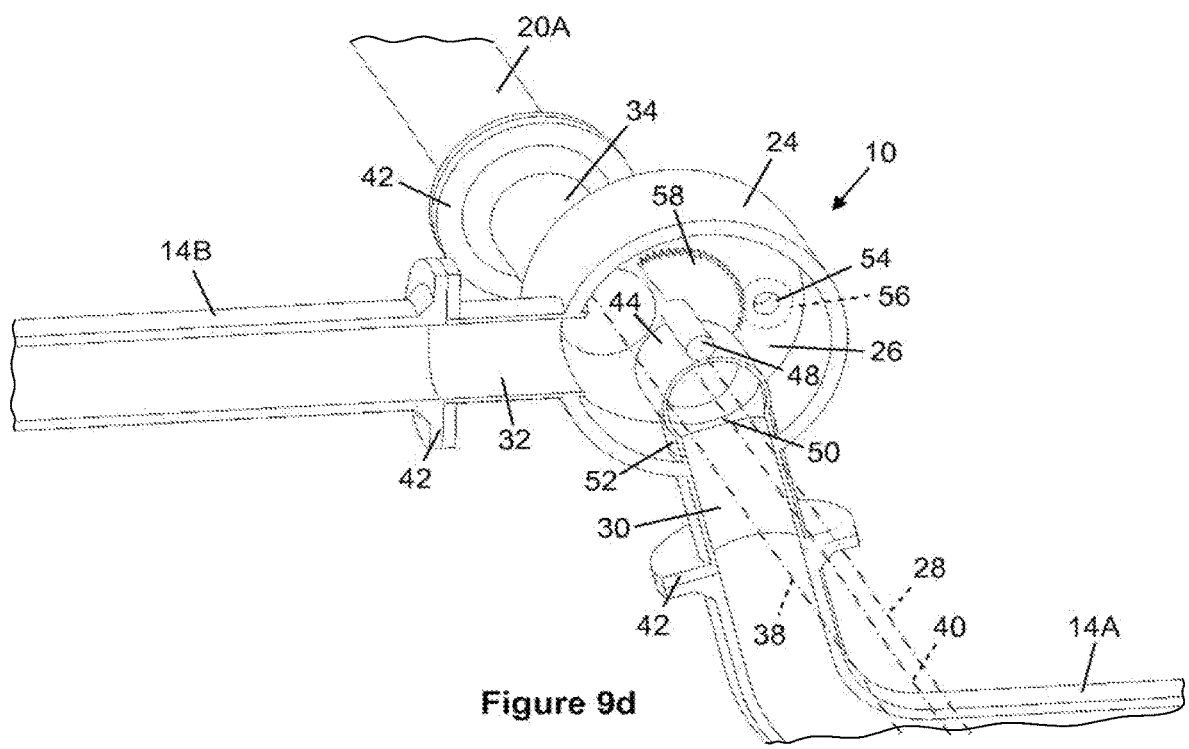

In the intermediate positions shown in FIGS. 8, 9b and 9c, the ends of the tube 44 are not aligned with the pig entry opening 34 or with the pig exit opening 36. Nor is the lateral aperture 50 of the tube 44 aligned with the flowline inlet port 30 or with the flowline outlet port 32. Consequently, the flowline inlet port 30, the flowline outlet port 32, the pig entry opening 34 and the pig exit opening 36 are all in fluid communication with each other through the hollow housing 24 of the diverter 10 when the tube 44 is in these intermediate positions. This ensures a continuous flow of production fluid along the flowline 14 through the diverter 10, mainly around rather than along or through the tube 44. This and other flow paths through the diverter 10 are illustrated in FIG. 8.

Many variations are possible within the inventive concept. For example, the pig holder need not be a closed tube but could instead be an open-sided channel. Such a channel could open radially outwardly with respect to the central longitudinal axis and be closed by the adjacent tubular wall of the housing. Thus, the channel and the tubular wall of the housing may cooperate to surround and locate the pig.

The pig holder can turn between the receiving and launching positions to a greater or lesser angular extent than is exemplified in the drawings. It is also possible for the pig holder to move within the housing by translation rather than by rotation.

The invention claimed is:

1. A pig diverter, comprising:
a hollow housing having a flowline inlet port, a flowline outlet port, a pig entry opening and a pig exit opening, all communicating with the interior of the housing, wherein the pig entry opening and the pig exit opening are disposed on respective sides of a longitudinal axis of the housing and communicate with the interior of the housing through respective opposed ends of the housing; and
a pig holder enclosed by and movable within the housing between a receiving position and a launching position, wherein the pig holder is a tube that extends along the housing and the opposed ends of the housing are positioned to close opposed ends of the tube, the pig holder being mounted to the housing or pivotal movement about a pivot axis between the receiving position and the launching position;
wherein, when in the receiving position, the pig holder is aligned with the pig entry opening to receive a pig; and
when in the launching position, the pig holder is aligned with the pig exit opening to launch a pig and effects fluid communication between the flowline inlet port and the pig exit opening; and
wherein a flow path is defined within the housing outside the pig holder, in a space between the housing and the pig holder.

2. The pig diverter of claim 1, wherein, when in the receiving position, the pig holder effects fluid communication between the pig entry opening and the flowline outlet port.

3. The pig diverter of claim 2, wherein the pig holder comprises an aperture positioned to effect fluid communication with the flowline inlet port when the pig holder is in the receiving position and with the flowline outlet port when the pig holder is in the launching position.

4. The pig diverter of claim 3, wherein the pig holder is elongate and the aperture is on an axis transverse to a longitudinal axis of the pig holder.

5. The pig diverter of claim 4, wherein the aperture is offset longitudinally toward one end of the pig holder.

6. The pig diverter of claim 1, wherein the pig entry opening and the pig exit opening are substantially equally spaced from the longitudinal axis of the housing.

7. The pig diverter of claim 1, wherein the pivot axis is aligned with the longitudinal axis of the housing.

8. The pig diverter of claim 1, wherein the pivot axis is disposed between a receiving axis that extends through the receiving position and a launching axis that extends through the launching position.

9. The pig diverter of claim 8, wherein the receiving axis and the launching axis are substantially parallel to each other and to the pivot axis.

10. The pig diverter of claim 8, wherein the receiving axis and the launching axis are substantially equi-spaced about the pivot axis.

11. The pig diverter of claim 1, wherein the flowline inlet port and the flowline outlet port are at longitudinally aligned positions with respect to the longitudinal axis of the housing.

12. The pig diverter of claim 1, wherein angular spacing about the longitudinal axis between the pig entry opening and the pig exit opening substantially matches that between the flowline inlet port and the flowline outlet port.

13. The pig diverter of claim 1, wherein when the pig holder is in the receiving position, the flow path effects fluid communication through the housing between the flowline inlet port and the pig exit opening.

14. The pig diverter of claim 1, wherein when the pig holder is in the launching position, the flow path effects fluid communication through the housing between the pig entry opening and the flowline outlet port.

15. The pig diverter of claim 1, wherein when the pig holder is at an intermediate position between the receiving position and the launching position, the flow path effects fluid communication through the housing between the flowline inlet port and the flowline outlet port.

16. A method of diverting a pig, comprising:
when a pig holder is on a receiving axis,
directing a flow of fluid from a pigging path outlet to a flowline outlet port, and receiving the pig into the pig holder from the pigging path outlet;
moving the pig holder and the received pig from the receiving axis onto a launching axis;
directing a bypass flow of fluid around the pig holder within an enclosure in which the pig holder is movable between the receiving axis and the launching axis; and
when the pig holder is on the launching axis,
directing a flow of fluid from a flowline inlet port to a pigging path inlet via the pig holder, and
launching the pig from the pig holder into the pigging path inlet.

17. The method of claim 16, comprising directing the flow of fluid from the pigging path outlet to the flowline outlet port via the pig holder when the pig holder is on the receiving axis.

18. The method of claim 16, comprising directing the bypass flow of fluid from the flowline inlet port to the pigging path inlet when the pig holder is on the receiving axis.

19. The method of claim 16, comprising directing the bypass flow of fluid from the pigging path outlet to the flowline outlet port when the pig holder is on the launching axis.

20. The method of claim 16, comprising directing the bypass flow of fluid from the flowline inlet port to the flowline outlet port when the pig holder is at an intermediate position between the receiving axis and the launching axis.

21. The method of claim 16, comprising pivoting the pig holder from the receiving axis to the launching axis.

22. The method of claim 21, comprising pivoting the pig holder about a pivot axis that is substantially parallel to the receiving axis and the launching axis.

23. The method of claim 16, comprising directing the flow of fluid to the flowline outlet port in a direction transverse to the receiving axis.

24. The method of claim 16, comprising directing the flow of fluid from the flowline inlet port in a direction transverse to the launching axis.

25. The method of claim 23, comprising directing the flow of fluid through a side wall of the pig holder.

26. The method of claim 16, further comprising returning the pig holder from the launching axis onto the receiving axis after launching the pig.

27. The method of claim 16, comprising receiving a pig launched from the pig holder.

28. The method of claim 27, comprising recirculating the pig in a loop.

29. A subsea installation comprising the pig diverter of claim 1.

30. A method of operating a subsea installation wherein a pig diverter operates in accordance with the method of claim 16.

* * * * *